United States Patent
O'Sullivan et al.

(10) Patent No.: US 12,547,796 B2
(45) Date of Patent: Feb. 10, 2026

(54) CRITICAL INFRASTRUCTURE BLUEPRINT SELECTION FOR OPTIMIZED RESPONSE TO STATE CHANGING CONDITIONS

(71) Applicant: Inlecom Group BV, Brussels (BE)

(72) Inventors: Patrick J O'Sullivan, Dublin (IE); Ioanna Fergadiotou, Ntrafi-Pikermi (GR); Antonios Mygiakis, Chalandri (GR); Aristea Maria Zafeiropoulou, Melissia (GR)

(73) Assignee: Inlecom Group BV, Brussels (BE)

( * ) Notice: Subject to any disclaimer, the term of this patent is extended or adjusted under 35 U.S.C. 154(b) by 1020 days.

(21) Appl. No.: 17/682,720

(22) Filed: Feb. 28, 2022

(65) Prior Publication Data
US 2023/0274050 A1  Aug. 31, 2023

(51) Int. Cl.
*G06F 30/20* (2020.01)
(52) U.S. Cl.
CPC .................. *G06F 30/20* (2020.01)
(58) Field of Classification Search
CPC ....................................... G06F 30/20
USPC ............................................. 703/6
See application file for complete search history.

(56) References Cited

U.S. PATENT DOCUMENTS

2025/0131729 A1* 4/2025 Schiffer ............. G06V 10/255

OTHER PUBLICATIONS

Yang_2022 (A Novel Embedding Model Based on a Transition System for Building Industry—Collaborative Digital Twin, Applied Sciences, Jan. 6, 2022) (Year: 2022).*
Shuvro_2019 (Predicting Cascading Failures in Power Grids using Machine Learning Algorithms, IEEE 2019). (Year: 2019).*

* cited by examiner

*Primary Examiner* — Brian S Cook
(74) *Attorney, Agent, or Firm* — CRGO Global; Steven M. Greenberg

(57) ABSTRACT

Critical infrastructure (CI) blueprint selection for optimized response to state changing conditions includes defining a hierarchy of interdependent CI elements of a community in a digital twin and receiving characterization data for different nodes of the digital twin. A fingerprint is generated for the hierarchy based upon the characterization and a blueprint which corresponds to the fingerprint retrieved from a data store, the blueprint defining a set of parameters to be applied to different computing elements of different nodes in the hierarchy determined to minimize a cascading effect of a state changing condition in one of the nodes. Finally, the set of parameters of the retrieved blueprint is applied to corresponding computing elements of the digital twin and a state changing condition is simulated in the digital twin in a selected node so as to compute the cascading effect of the state changing condition to other nodes dependent upon the selected node.

15 Claims, 3 Drawing Sheets

CRITICAL INFRASTRUCTURE BLUEPRINT SELECTION FOR OPTIMIZED RESPONSE TO STATE CHANGING CONDITIONS

BACKGROUND OF THE INVENTION

Field of the Invention

The present invention relates to the technical field of infrastructure modeling and more particular to the modeling of an impact of an adverse event upon a hierarchy of interdependent critical infrastructure nodes.

Description of the Related Art

Critical infrastructure (CI) refers to those community structural devices delivering critical services to a community. Examples include elements of the public water supply and distribution network, elements of the cellular telephonic communications network, elements of the electric power distribution network, elements of the natural gas distribution network, roadways, waterways, bridges and tunnels and so forth. In the modern era, much of the operability and tunability of CI elements in a community depend upon the proper and secure functioning of computing devices sensing the state of affairs in the respective CI elements and commanding the operation of electromechanical control elements in response to the sensed state of affairs. Thus, the failure of a computational controller for a given CI element often will result in the failure of the given CI element itself.

In the case of an ordinary control system controlling a single structural element, such as a machine in a factory, one must monitor the operation of the control system and the operation of the machine only, since the failure only impacts the operation of the machine. However, in many instances, different controlled machines depend upon other controlled machines such that the failure of one machine can cascade in impact upon other machines within a hierarchy of machines. Yet, in the circumstance of an interdependent hierarchy of machines in a factory, an overlord process can monitor the entirety of the hierarchy and the corresponding controllers in order to appreciate the impact of an exception in one of the machines upon interdependent others of the machines.

In the case of interdependent CI elements in a community, so much is not the case. To wit, in a typical geographically definable community, different CI elements not only may be geographically disbursed about a large area—much larger than any ordinary factor, but the geographically disbursed CI elements may be managed by different individuals or teams of individuals and in some cases, by different teams of individuals not adapted to share in real time the health of any given CI element and its corresponding controller. Further, as is most often the case, different CI elements in the community often relate to completely different organizations providing completely different services to the community, such as wastewater management, telecommunications and power distribution.

The problem of heterogeneous CI elements supporting the delivery of heterogeneous services to a community affects the manner in which community managers prepare for adverse events. In the instance of a single service provider in the community for a single community service, one can model the operation of corresponding CI elements in support of the delivery of the single community service and the behavior of those CI elements in the face of an adverse event. However, in so far as different service providers in a community lack data sharing and connectivity, no modeling heretofore has been possible as to the impact of a state changing condition in one CI element of one service provider providing one service to the community, upon the state of one or more CI elements of other service providers for the community providing other services to the community.

Consequently, while planning for the impact of a state changing condition in a single CI element of a community can be routine, planning in a CI element of interest for the impact of a state changing condition in a different CI element in the community upon which the CI element of interest depends is far from routine and requires tedious, manual interactions with different personnel of the different CI elements. Lacking data interoperability, there is no ability to automate communication between the CI elements so as to assess the cascading effect of a state changing condition in one of the CI elements. Indeed, in many instances, establishing the correct parameters of operation of data processing equipment in a CI to minimize the cascading effect of a state changing condition in another CI element of dependence, is heavily reliant upon the individual proprietary knowledge through experience of the personnel.

BRIEF SUMMARY OF THE INVENTION

Embodiments of the present invention address technical deficiencies of the art in respect to minimizing the cascading effect of a state changing condition in one CI element of one service provider providing service to the community, upon one or more CI elements of other service providers for the community providing other services to the community. To that end, embodiments of the present invention provide for a novel and non-obvious method for CI blueprint selection for optimized response to state changing conditions. Embodiments of the present invention also provide for a novel and non-obvious computing device adapted to perform the foregoing method. Finally, embodiments of the present invention provide for a novel and non-obvious data processing system incorporating the foregoing device in order to perform the foregoing method.

In one embodiment of the invention, a method for CI blueprint selection for optimized response to state changing conditions includes the definition of a hierarchy of interdependent CI elements of a community in a digital twin executing in memory of a host computing platform and the receipt of characterization data for different nodes of the digital twin. The method additionally includes the generation of a fingerprint for the hierarchy based upon the characterization, namely a data structure including one or more data members the combination of which uniquely identify the characterization data of one or more CI elements associated with the data structure. Then, a blueprint which corresponds to the fingerprint may be retrieved from a data store, the blueprint defining a set of parameters to be applied to different computing elements of different ones of the nodes in the hierarchy determined to minimize a cascading effect of a state changing condition in one of the nodes. Finally, the set of parameters of the retrieved blueprint is applied to corresponding ones of the computing elements of the different nodes of the digital twin so as to establish an optimal set of parameters for minimizing the effect of the state changing condition in the hierarchy already determined to have been effective in minimizing the effect of the same state changing condition in a structurally similar hierarchy. Thereafter, a state changing condition can be simulated in the digital twin in a selected one of the nodes so as to compute a cascading effect of the state changing condition to others of the nodes dependent upon the selected one of the nodes.

In one aspect of the embodiment, the method additionally includes responding to a determination that a blueprint cannot be found in the data store which corresponds to the fingerprint, by defining a new blueprint for the fingerprint and by storing the blueprint in the data store. As such, when an optimal set of parameters is determined for minimizing the cascading effect of the state changing condition in the hierarchy, the parameters can be written to the new blueprint for use by subsequent requesting hierarchies of similar structure. In another aspect of the embodiment, the blueprint is determined to correspond to the fingerprint upon a threshold matching of a portion of the characterization to a characterization associated with the blueprint.

In yet another aspect of the embodiment, the characterization data is streamingly received from individual Internet of Things (IoT) enabled computing devices each embedded in a different CI element represented by a corresponding one of the nodes, or alternatively, the characterization data is retrieved from a repository of previously collected characterization data from individual IoT enabled computing devices each embedded in a different CI element represented by a corresponding one of the nodes.

In even yet another aspect of the embodiment, the application of the set of the parameters of the blueprint to corresponding ones of the computing elements of the different ones of the nodes of the digital twin, further includes transmitting to each one of the IoT enabled computing devices, a corresponding one of the set of the parameters and a directive to apply the corresponding one of the set of the parameters thereto.

In another embodiment of the invention, a data processing system is adapted for CI blueprint selection for optimized response to state changing conditions. The system includes a host computing platform with one or more computers, each with memory and one or processing units including one or more processing cores. The system also includes a digital twin defined in the memory, the digital twin modeling an interdependent hierarchy of CI. The system yet further includes a blueprint selection module. The module includes computer program instructions enabled while executing in the memory of at least one of the processing units of the host computing platform to receive characterization data for different nodes of the digital twin, to generate a fingerprint for the hierarchy based upon the characterization, to retrieve from a data store a blueprint corresponding to the fingerprint, the blueprint defining a set of parameters to be applied to different computing elements of different ones of the nodes determined to minimize a cascading effect of a state changing condition in one of the nodes, to apply the set of the parameters of the blueprint to corresponding ones of the computing elements of the different ones of the nodes of the digital twin and to simulate a state changing condition in the digital twin in a selected one of the nodes and computing a cascading effect of the state changing condition to others of the nodes dependent upon the selected one of the nodes.

In this way, the technical deficiencies of the optimizing a hierarchy of CI in minimizing the cascading effect of a state changing condition in one CI element can be overcome by adapting proven minimization solutions in similar CI hierarchies to the selected CI hierarchy without subjecting the selected CI hierarchy to the often impossible inter-organizational sharing of simulated impacts of a state changing condition and the simulation of those impacts upon each CI element in the CI hierarchy. Instead, the obstacle of the lack of interoperability amongst independently operating CI elements in an interdependent hierarchy of CI elements for a community are overcome owing to the modeling of the interdependent hierarchy in a digital twin, the matching of the hierarchy with another hierarchy for which a blueprint of best practices parameters have already been determined in respect to the minimization of the cascading effect of a state changing condition of node in the hierarchy, and the application of the settings of the blueprint to the hierarchy modeled in the digital twin.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for CI blueprint selection for optimized response to state changing conditions. In accordance with an embodiment of the invention, a hierarchy of interdependent CI elements of a common community can be modeled within a digital twin executing in memory of a computer. Each node of the digital twin includes one or more parameters defined for one or more respective computing devices modeled within the node. The hierarchy as modeled in the digital twin is then characterized, for instance according to a structural architecture of the nodes, namely the nature of each of the nodes and the arrangement of the nodes with respect to one another. The characterization is then compared to pre-existing characterizations of other hierarchies and a most similar one of the hierarchies can be identified. A blueprint associated with the identified similar hierarchy for a different community is then retrieved and the parameter values of the blueprint are applied to respective ones of the parameters of the node of the hierarchy in the digital twin. In this way, a predetermined blueprint known to minimize the cascading impact of a state changing condition in CI element can be used to achieve the same effect in the hierarchy notwithstanding the lack of interoperability between the nodes of the common community and the lack of interoperability between the nodes of the different community.

Figure 1:
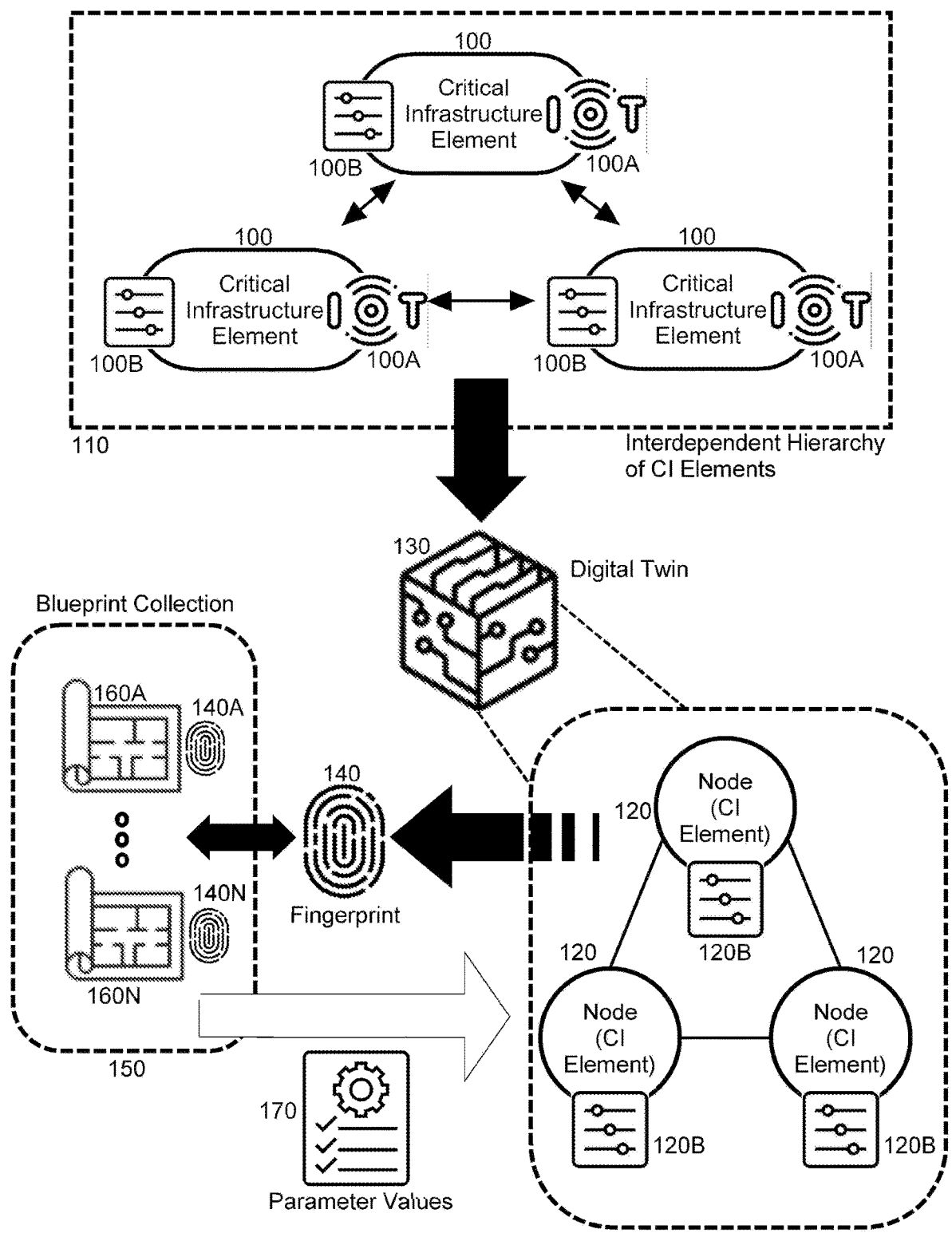
FIG. 1 is a pictorial illustration reflecting different aspects of a process of CI blueprint selection for optimized response to state changing conditions.

In illustration of one aspect of the embodiment, FIG. 1 pictorially shows a process of CI blueprint selection for optimized response to state changing conditions. As shown in FIG. 1, a digital twin 130 is created for an interdependent hierarchy of CI elements 110. The interdependent hierarchy of CI elements 110 includes different CI elements 100, each with one or more IoT enabled computing devices 100A and corresponding parameter settings 100B. The digital twin 130 models each CI element 100 in the interdependent hierarchy of CI elements 110 with a corresponding node 120 including corresponding parameter settings 120B, arranged in a same interdependent hierarchy as that of the interdependent hierarchy of CI elements 110.

Importantly, the digital twin 130 can be modeled according to a number of factors such as a number and type of each node 120, an architectural arrangement of the nodes 120, or a portion of the nodes 120, one or more of the parameter settings 120B, or any combination thereof. The characterization is then reduced to a fingerprint 140 which can include a data structure reflecting the characterization. A collection of blueprints 150 including one or more blueprints 160A, 160N and correspondingly associated fingerprints 140A, 140N, is then queried with the fingerprint 140 in order to locate a threshold matching one of the fingerprints 140A, 140N. A corresponding one of the blueprints 160A, 160N is then retrieved and a set of parameter values 170 extracted from the corresponding one of the blueprints 160A, 160N. Finally, the extracted set of parameter values 170 is applied to the parameter settings 120B of the digital twin 130 and the digital twin 130 then simulates the cascading impact of a state changing condition occurring in one of the nodes 120 upon the other nodes 120 in light of the parameter settings 120B.

Figure 2:
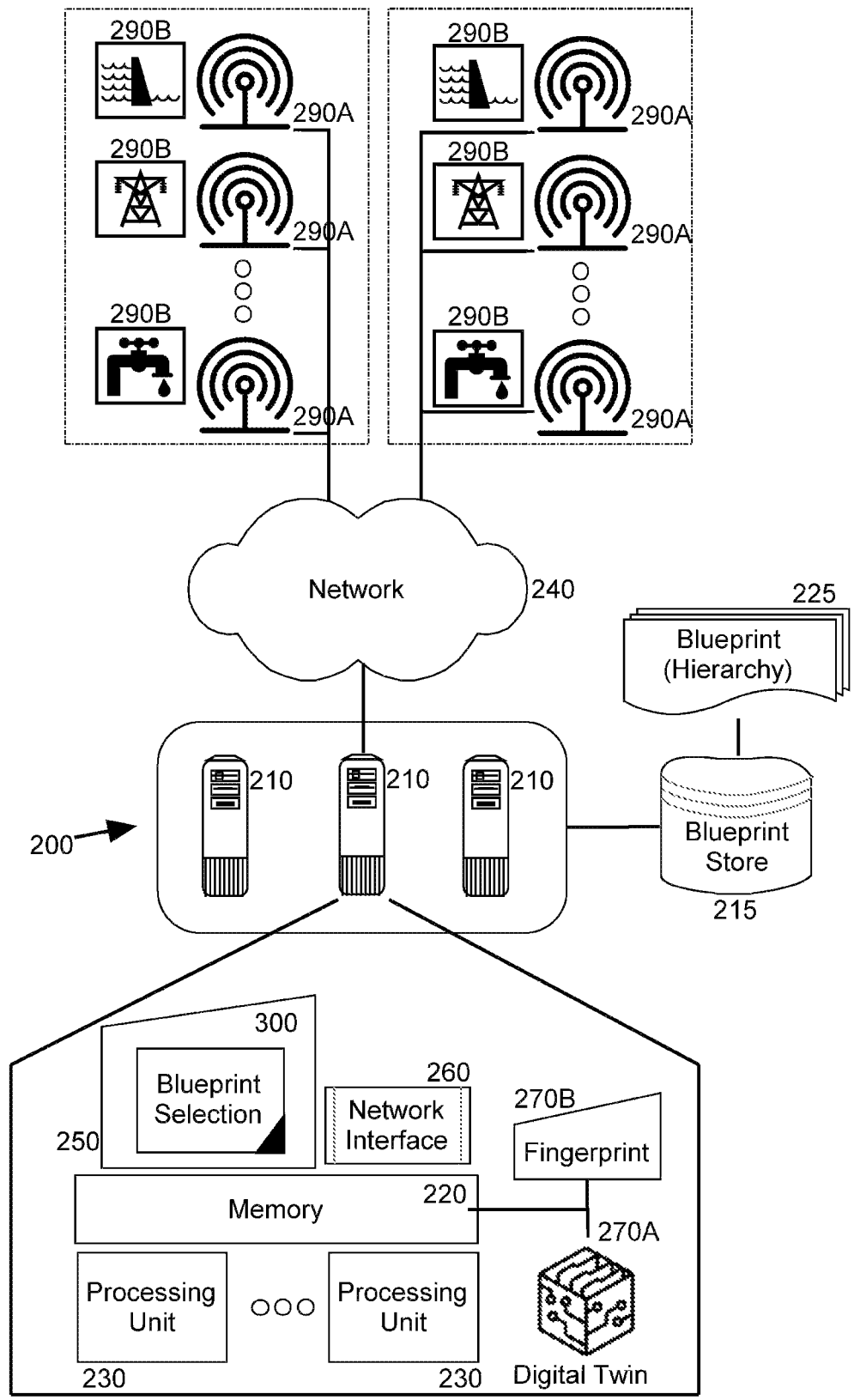
FIG. 2 is a block diagram depicting a data processing system adapted to perform one of the aspects of the process of FIG. 1; and, FIG. 3 is a flow chart illustrating one of the aspects of the process of FIG. 1.

Aspects of the process described in connection with FIG. 1 can be implemented within a data processing system. In further illustration, FIG. 2 schematically shows a data processing system adapted to perform CI blueprint selection for optimized response to state changing conditions. In the data processing system illustrated in FIG. 1, a host computing platform 200 is provided. The host computing platform 200 includes one or more computers 210, each with memory 220 and one or more processing units 230. The computers 210 of the host computing platform (only a single computer shown for the purpose of illustrative simplicity) can be co-located within one another and in communication with one another over a local area network, or over a data communications bus, or the computers can be remotely disposed from one another and in communication with one another through network interface 260 over a data communications network 240.

In this regard, different CI elements 290B of different hierarchies of interdependent ones of CI elements for different communities communicate through corresponding IoT devices 290A with the host computing platform 200 over the data communications network 240 by way of the network interface 260. The memory 220 includes therein a digital twin 270A modeling a selected one of the hierarchies of the interdependent CI elements 290B. As well, the host computing platform has coupled thereto, fixed storage 215 in which different blueprints 225 are stored, each corresponding to a particular hierarchical structure of the CI elements 290B in a corresponding community and each defining a collection of settings for each of the CI elements 290B requisite to minimize the cascading effect of a state changing condition in one of the CI elements 290B.

Notably, a computing device 250 including a non-transitory computer readable storage medium can be included with the data processing system 200 and accessed by the processing units 230 of one or more of the computers 210. The computing device stores 250 thereon or retains therein a program module 300 that includes computer program instructions which when executed by one or more of the processing units 230, performs a programmatically executable process for CI blueprint selection for optimized response to state changing conditions. Specifically, the program instructions during execution construct the digital twin 270A by defining a hierarchy of nodes corresponding to the CI elements 290B of a corresponding community, associating different ones of the nodes in the hierarchy with other nodes in the hierarchy so as to create a dependency relationship therebetween. One or more parameterized settings are then defined for each of the nodes. Importantly, the program instructions are enabled to characterize the nodes of the digital twin 270A. In this regard, the characterization can include a number and type of the nodes, a specific arrangement of the nodes or a specific arrangement of a portion of the nodes, or specific parameterized settings established for specific computing devices modeled by the nodes. In one aspect of the embodiment illustrated in FIG. 2, the characterization is streamingly received over the data communications network 240 from individual ones of the IoT devices 290A for corresponding ones of the CI elements 290B represented by corresponding ones of the nodes in the digital twin 270A. In another aspect of the embodiment illustrated in FIG. 2, the characterization is retrieved from a repository of previously collected characterization data from the IoT devices 290A for corresponding ones of the CI elements 290B represented by corresponding ones of the nodes in the digital twin 270A. In any circumstance, the program instructions are enabled to generate a fingerprint 270B for the characterization, such as a data structure describing the characterization.

The program instructions yet further are enabled to query the blueprint data store 215 with the fingerprint 270B in order to identify one of the blueprints 225 having an associated fingerprint matching the fingerprint 270B. To the extent that the program instructions match the fingerprint 270B to that of a corresponding one of the blueprints 225, the program instructions extract from the corresponding one of the blueprints 225, parameter settings which the program instructions then apply to the nodes of the digital twin 270A. Consequently, the digital twin 270A then simulates a state changing condition in one of the nodes and measures a cascading impact of the state changing condition upon dependent ones of others of the nodes resulting from the applied parameter settings. Alternatively to or in addition to the simulation, the digital twin 270A can transmit directives over the data communications network 240 directly to communicatively coupled ones of the IoT devices 270A applying corresponding ones of the extracted parameter settings to respective ones of the IoT devices 270 to which the corresponding ones of the extracted parameter settings apply.

On the other hand, to the extent that the program instructions cannot match the fingerprint 270B to any of those of the corresponding ones of the blueprints 225, a program instructions define and store a new blueprint in the blueprint data store 215 including the existing parameters settings of the nodes of the digital twin 270A.

Figure 3:
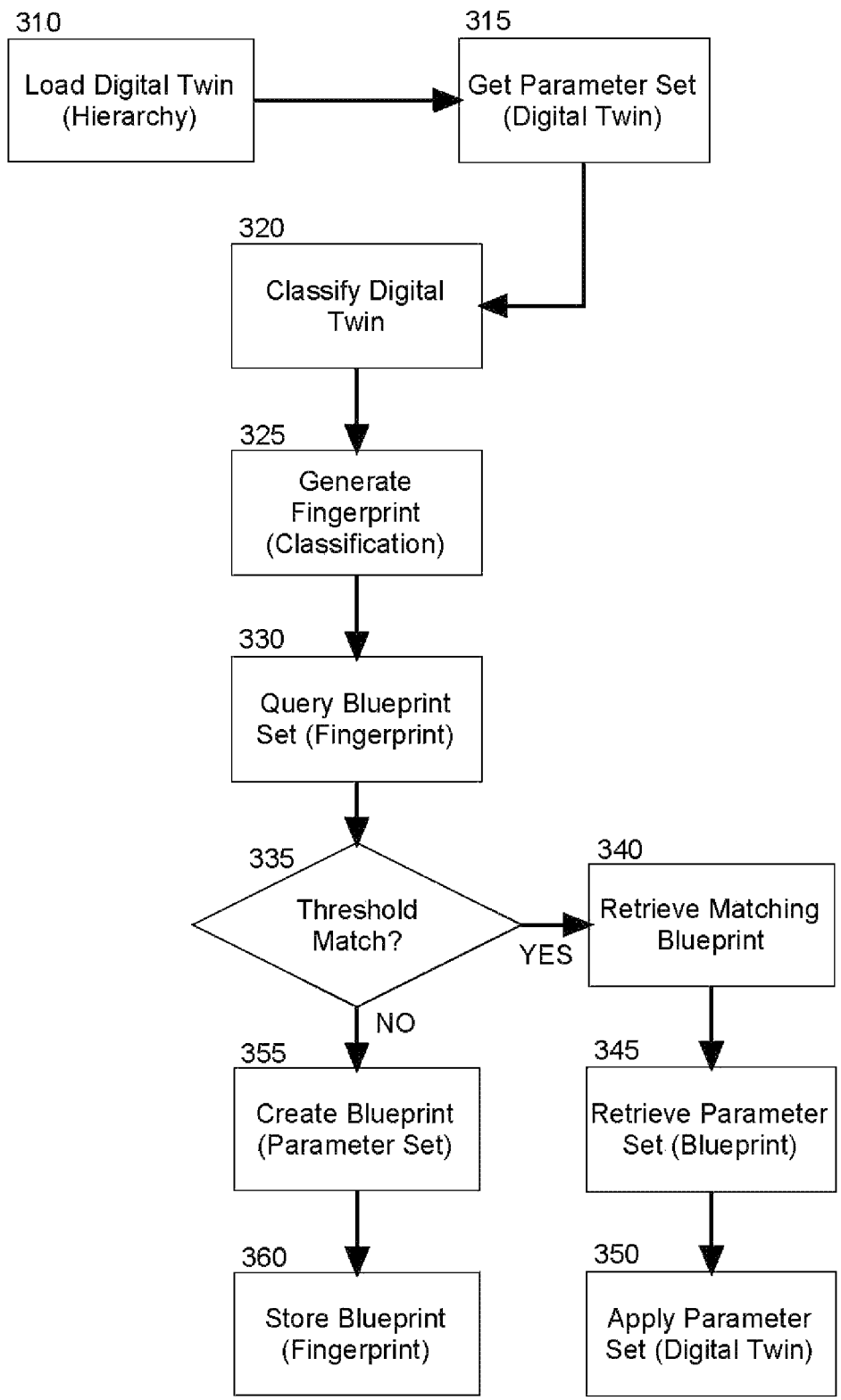

In further illustration of an exemplary operation of the module, FIG. 3 is a flow chart illustrating one of the aspects of the process of FIG. 1. Beginning in block 310, a digital twin is loaded into memory of a computing system, the digital twin defining a hierarchal arrangement of interdependent nodes, each of the nodes modeling a CI element in an interdependent hierarchy of CI elements, and each of the nodes encapsulating one or more parameters settings for one or more computing devices deployed in a corresponding one of the CI elements. In block 315, the parameter values for the digital twin are extracted and the number, type and arrangement of the nodes in twin along with the extracted parameters are used to characterize the digital twin in block 320. Then, in block 325, a fingerprint is generated for the characterization in the form of a data structure uniquely defining the characterization in a single value or set of values.

In block 330, the generated fingerprint is submitted as a query to a blueprint set. Thereafter, in decision block 335, if the generated fingerprint matches within a pre-defined threshold, a fingerprint associated with a blueprint in the blueprint set, in block 340 the associated blueprint is retrieved from the set and a parameter set for the blueprint extracted in block 345. Thereafter, in block 350 the extracted parameters set is applied to as parameter values for the nodes of the digital twin in place of the parameter settings extracted from the nodes previously. In decision block 335, however, if the generated fingerprint does not match within the pre-defined threshold, a fingerprint associated with a blueprint in the blueprint set, in block 355, a new blueprint is created for the digital twin including the parameter values extracted from the nodes previously. Finally, in block 360 the newly created blueprint is stored in the blueprint set in association with the generated fingerprint. In this way, the parameter values of the newly created blueprint can be applied to a later defined digital twin threshold sharing a characterization to that of the loaded digital twin.

Of import, the foregoing flowchart and block diagram referred to herein illustrate the architecture, functionality, and operation of possible implementations of systems, methods, and computing devices according to various embodiments of the present invention. In this regard, each block in the flowchart or block diagrams may represent a module, segment, or portion of instructions, which includes one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More specifically, the present invention may be embodied as a programmatically executable process. As well, the present invention may be embodied within a computing device upon which programmatic instructions are stored and from which the programmatic instructions are enabled to be loaded into memory of a data processing system and executed therefrom in order to perform the foregoing programmatically executable process. Even further, the present invention may be embodied within a data processing system adapted to load the programmatic instructions from a computing device and to then execute the programmatic instructions in order to perform the foregoing programmatically executable process.

To that end, the computing device is a non-transitory computer readable storage medium or media retaining therein or storing thereon computer readable program instructions. These instructions, when executed from memory by one or more processing units of a data processing system, cause the processing units to perform different programmatic processes exemplary of different aspects of the programmatically executable process. In this regard, the processing units each include an instruction execution device such as a central processing unit or "CPU" of a computer. One or more computers may be included within the data processing system. Of note, while the CPU can be a single core CPU, it will be understood that multiple CPU cores can operate within the CPU and in either instance, the instructions are directly loaded from memory into one or more of the cores of one or more of the CPUs for execution.

Aside from the direct loading of the instructions from memory for execution by one or more cores of a CPU or multiple CPUs, the computer readable program instructions described herein alternatively can be retrieved from over a computer communications network into the memory of a computer of the data processing system for execution therein. As well, only a portion of the program instructions may be retrieved into the memory from over the computer communications network, while other portions may be loaded from persistent storage of the computer. Even further, only a portion of the program instructions may execute by one or more processing cores of one or more CPUs of one of the computers of the data processing system, while other portions may cooperatively execute within a different computer of the data processing system that is either co-located with the computer or positioned remotely from the computer over the computer communications network with results of the computing by both computers shared therebetween.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for critical infrastructure (CI) blueprint selection for optimized response to state changing conditions, the method comprising:
defining a hierarchy of interdependent CI elements of a community in a digital twin executing in memory of a host computing platform;

receiving characterization data for different nodes of the digital twin;

generating a fingerprint for the hierarchy based upon the characterization;

retrieving from a data store a blueprint corresponding to the fingerprint, the blueprint defining a set of parameters to be applied to different computing elements of different ones of the nodes determined to minimize a cascading effect of a state changing condition in one of the nodes wherein the blueprint is determined to correspond to the fingerprint upon a threshold matching of a portion of the characterization to a characterization associated with the blueprint;

applying the set of the parameters of the blueprint to corresponding ones of the computing elements of the different ones of the nodes of the digital twin;

simulating a state changing condition in the digital twin in a selected one of the nodes and computing a cascading effect of the state changing condition to others of the nodes dependent upon the selected one of the nodes; and responsive to a determination that a blueprint cannot be found in the data store which corresponds to the fingerprint, defining a new blueprint for the fingerprint and storing the blueprint in the data store.

2. The method of claim 1, wherein the blueprint is determined to correspond to the fingerprint upon a threshold matching of a portion of the characterization to a characterization associated with the blueprint.

3. The method of claim 1, wherein the characterization data is streamingly received from individual Internet of Things (IoT) enabled computing devices each embedded in a different CI element of the hierarchy represented by a corresponding one of the nodes in the digital twin.

4. The method of claim 1, wherein the characterization data is retrieved from a repository of previously collected characterization data from individual Internet of Things (IoT) enabled computing devices each embedded in a different CI element of the hierarchy represented by a corresponding one of the nodes in the digital twin.

5. The method of claim 3, wherein the application of the set of the parameters of the blueprint to corresponding ones of the computing elements of the different ones of the nodes of the digital twin, further comprises transmitting to each one of the IoT enabled computing devices, a corresponding one of the set of the parameters and a directive to apply the corresponding one of the set of the parameters thereto.

6. A data processing system adapted for critical infrastructure blueprint selection for optimized response to state changing conditions, the system comprising:

a host computing platform comprising one or more computers, each with memory and one or processing units including one or more processing cores;

a digital twin defined in the memory and modeling a hierarchy of interdependent CI elements of a community; and, a blueprint selection module comprising computer program instructions enabled while executing in the memory of at least one of the processing units of the host computing platform to perform:

receiving characterization data for different nodes of the digital twin;

generating a fingerprint for the hierarchy based upon the characterization;

retrieving from a data store a blueprint corresponding to the fingerprint, the blueprint defining a set of parameters to be applied to different computing elements of different ones of the nodes determined to minimize a cascading effect of a state changing condition in one of the nodes;

applying the set of the parameters of the blueprint to corresponding ones of the computing elements of the different ones of the nodes of the digital twin;

simulating a state changing condition in the digital twin in a selected one of the nodes and computing a cascading effect of the state changing condition to others of the nodes dependent upon the selected one of the nodes; and responsive to a determination that a blueprint cannot be found in the data store which corresponds to the fingerprint, defining a new blueprint for the fingerprint and storing the blueprint in the data store.

7. The system of claim 6, wherein the blueprint is determined to correspond to the fingerprint upon a threshold matching of a portion of the characterization to a characterization associated with the blueprint.

8. The system of claim 6, wherein the characterization data is streamingly received from individual Internet of Things (IoT) enabled computing devices each embedded in a different CI element of the hierarchy represented by a corresponding one of the nodes.

9. The system of claim 6, wherein the characterization data is retrieved from a repository of previously collected characterization data from individual Internet of Things (IoT) enabled computing devices each embedded in a different CI element of the hierarchy represented by a corresponding one of the nodes.

10. The system of claim 8, wherein the application of the set of the parameters of the blueprint to corresponding ones of the computing elements of the different ones of the nodes of the digital twin, further comprises transmitting to each one of the IoT enabled computing devices, a corresponding one of the set of the parameters and a directive to apply the corresponding one of the set of the parameters thereto.

11. A computing device comprising a non-transitory computer readable storage medium having program instructions stored therein, the instructions being executable by at least one processing core of a processing unit to cause the processing unit to perform a method for critical infrastructure blueprint selection for optimized response to state changing conditions, the method including:

defining a hierarchy of interdependent CI elements of a community in a digital twin executing in memory of a host computing platform;

receiving characterization data for different nodes of the digital twin;

generating a fingerprint for the hierarchy based upon the characterization;

retrieving from a data store a blueprint corresponding to the fingerprint, the blueprint defining a set of parameters to be applied to different computing elements of different ones of the nodes determined to minimize a cascading effect of a state changing condition in one of the nodes;

applying the set of the parameters of the blueprint to corresponding ones of the computing elements of the different ones of the nodes of the digital twin;

simulating a state changing condition in the digital twin in a selected one of the nodes and computing a cascading effect of the state changing condition to others of the nodes dependent upon the selected one of the nodes; and responsive to a determination that a blueprint cannot be found in the data store which corresponds to the fingerprint, defining a new blueprint for the fingerprint and storing the blueprint in the data store.

12. The device of claim 11, wherein the blueprint is determined to correspond to the fingerprint upon a threshold matching of a portion of the characterization to a characterization associated with the blueprint.

13. The device of claim 11, wherein the characterization data is streamingly received from individual Internet of Things (IoT) enabled computing devices each embedded in a different CI element of the hierarchy represented by a corresponding one of the nodes.

14. The device of claim 11, wherein the characterization data is retrieved from a repository of previously collected characterization data from individual Internet of Things (IoT) enabled computing devices each embedded in a different CI element of the hierarchy represented by a corresponding one of the nodes.

15. The device of claim 13, wherein the application of the set of the parameters of the blueprint to corresponding ones of the computing elements of the different ones of the nodes of the digital twin, further comprises transmitting to each one of the IoT enabled computing devices, a corresponding one of the set of the parameters and a directive to apply the corresponding one of the set of the parameters thereto.

* * * * *